United States Patent
Bishop

(10) Patent No.: US 6,744,578 B1
(45) Date of Patent: Jun. 1, 2004

(54) METHOD AND APPARATUS FOR CONTROLLING WRITE CURRENT IN WRITER DRIVERS

(75) Inventor: Andrew Bishop, Essex, VT (US)

(73) Assignee: Maxtor Corporation, Longmont, CO (US)

(*) Notice: Subject to any disclaimer, the term of this patent is extended or adjusted under 35 U.S.C. 154(b) by 498 days.

(21) Appl. No.: 09/951,074

(22) Filed: Sep. 10, 2001

(51) Int. Cl.[7] ............................................... G11B 27/36
(52) U.S. Cl. .............................. 360/31; 360/68; 360/66
(58) Field of Search ............................ 360/68, 31, 66, 360/63, 46, 67; 324/210, 212; 327/108, 110

(56) References Cited

U.S. PATENT DOCUMENTS 6,356,113 B1 * 3/2002 Contreras et al. ............. 326/82
6,671,113 B2 * 12/2003 Klaassen et al. .............. 360/46

OTHER PUBLICATIONS

Nyquist, H.; "Abridgment of Certain Topics in Telegraph Transmission Theory"; Journal AIEE; 1928; pp. 214–217.

* cited by examiner

Primary Examiner—Alan T. Faber

(57) ABSTRACT

A technique and associated circuitry are provided for measuring a buffered write head voltage, and measurement of thin-film write head DC head voltage in a disk-drive, along with a procedure for calibrating/optimizing the write current amplitude based on the measurement of the buffered write head voltage. A write driver includes a terminating resistor, coupled to the write element of a transducer head in a disk drive, wherein controlling the write current of the write driver includes the steps of measuring the resistance $R_W$ of the terminating resistor; measuring the resistance $R_C$ of the write element; and generating the write current amplitude based on the resistances $R_C$ and $R_W$.

35 Claims, 6 Drawing Sheets

US 6,744,578 B1

METHOD AND APPARATUS FOR CONTROLLING WRITE CURRENT IN WRITER DRIVERS

FIELD OF THE INVENTION

The present invention relates generally to read/write transducer heads, and in particular to measuring thin-film write head DC head voltage in a disk drive.

BACKGROUND OF THE INVENTION

In recording of data on magnetic media with transducer heads, such as in disk drive data storage systems, the magnetic recording performance is sensitive to write current amplitude in the head. As data rates and recording densities are pushed to the limits of technology it becomes crucial to overall cost and performance to extend the performance of the overall recording system.

As shown by example in FIG. 1A, in disk drives with magneto-resistive (MR) heads each transducer head 10 includes a thin-film writer element (write coil) 12 connected to a writer driver 14 in a preamplifier (Preamp) 16 via an interconnect 18, and a read element (MR Read Sensor) 20 connected to a read amplifier 22 in the preamplifier 16, via the interconnect (transmission line) 18.

The write driver 14 employs a low-impedance output stage followed by a series termination resistance to drive the write current $I_{WC}$ out to the write element 12. The series termination resistance is used to terminate the transmission line 18 from the write driver 14 out to the thin-film write element 12. The write current amplitude $I_{WC}$ in the transducer head generated by the write driver 14 is one of the critical parameters for magnetic recording. A consequence of using the low-impedance output buffer in the write driver 14 is that the amplitude (magnitude) of the write current is sensitive to the DC resistance of the thin-film write element 12 as well as the interconnects 18, and the absolute value of the termination resistance. In order to more accurately predict the magnitude of the write field output from the head 10, it is necessary to optimize (calibrate) the output voltage of the low-impedance write driver 14, and hence the write current $I_{WC}$.

Further, if the amplitude of the write current is not well controlled across a population of transducer heads 10, preamplifiers 16 and interconnects 18, then the overall system performance versus cost is subject to the limits imposed by the worst case (lowest) write current. The lowest write current of a population of transducer heads 10 results from the combination of the highest resistance of each of the following components: the thin-film writer 12, the interconnect 18 and the termination resistance of the voltage-mode (matched-impedance) write driver 14. In conventional disk drives, over-driving the remaining population of heads 10 can result is a number of problems with the write process such as poorly defined write field as a result of over-driven heads, excess power consumption within the preamplifier 16, and increased write-to-read coupling.

There is a need, therefore, for a method and apparatus for calibrating the write current in a transducer head. There is also a need for a method of calibrating output voltage of low-impedance write drivers to generate the desired write current. There is also a need for a method of overcoming the uncertainty in write current amplitude that results from the use of conventional voltage-mode or matched-impedance write driver architecture.

SUMMARY OF THE INVENTION

The present invention satisfies these needs by providing method and apparatus to optimize (calibrate) the low-impedance write driver voltage, and hence the write current. The present invention allows measurement of a thin-film write head DC head voltage within a disk-drive, and calibration of the write current based on the measured voltage.

In one embodiment, the present invention provides a technique and associated circuitry for measuring the buffered write head voltage (e.g., measurement of thin-film write head DC head voltage) along with a procedure for controlling (calibrating) the write current amplitude generated by the write driver based on the measurement of the buffered write head voltage. The write driver includes a terminating resistor, coupled to the write element of a transducer head in a disk drive, wherein controlling the write current of the write driver includes the steps of: measuring the resistance $R_W$ of the terminating resistor; measuring the resistance $R_C$ of the write element; and generating the write current amplitude based on the resistances $R_C$ and $R_W$.

In one example, the write driver further includes a voltage source and a switch for electrically connecting the voltage source in series with the terminating resistor $R_W$ and the write element, such that the steps of measuring $R_W$ and $R_C$ further include the steps of: with the voltage source disconnected, connecting a current source ($I_{WB}$) across the parallel combination of the terminating resistor and the write element, and measuring a resulting first voltage across the parallel combination of the resistances $R_C$ and $R_W$; with the current source disconnected, connecting the voltage source ($V_W$) in series with the terminating resistor and the write element, and measuring a second voltage across the series combination of the resistances $R_C$ and $R_W$; and determining the values of $R_C$ and $R_W$ based on said two measured first and second voltages. Generating the write current further includes the steps of adjusting the voltage $V_W$ of the voltage source to generate a desired write current $I_{WC}$ based on the resistances $R_C$ and $R_W$, such that: $I_{WC}=V_W/(R_C+R_W)$.

Conventionally, the write current amplitude is subjected to an unknown variation due to process tolerances in the head and preamplifier. These variances can degrade the write process by an unknown disturbance function. The present invention overcomes the uncertainty in setting the write current amplitude that results from the use of a voltage-mode or matched-impedance write driver architecture, by providing a method and practical circuits for calibrating the write current amplitude against a current source ($I_{WB}$), wherein the current source ($I_{WB}$) is based on a precise reference current (REF) independent of the DC resistance of the thin-film write head. As such, according to the present invention, the write current amplitude can be accurately controlled without sensitivity to the DC resistance of the head plus interconnect resistance ($R_C$) or the output impedance of the write driver ($R_W$).

BRIEF DESCRIPTION OF THE DRAWINGS

These and other features, aspects and advantages of the present invention will become understood with reference to the following description, appended claims and accompanying figures where:

Figure 1A:
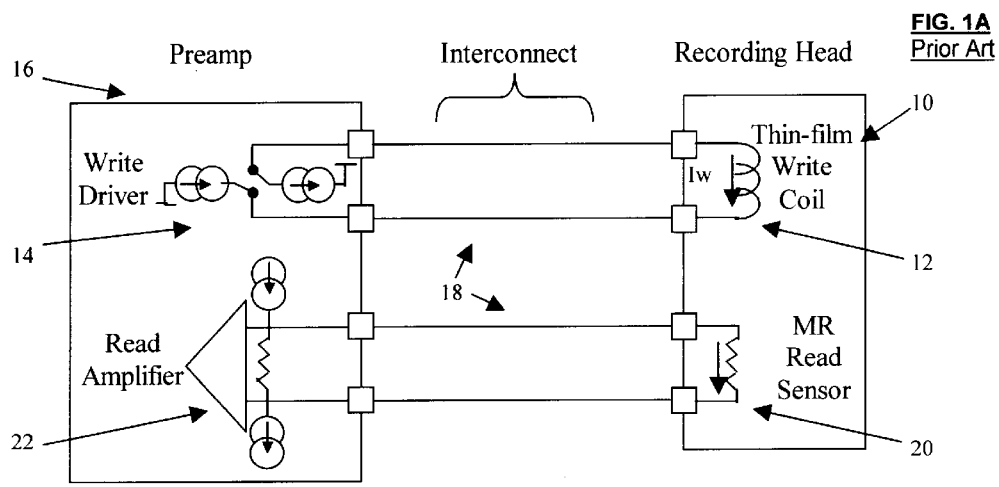
FIG. 1A shows an example block diagram of an embodiment of a recording head, writer driver, read preamplifier and interconnect.

In the drawings, like references refer to like components.

DETAILED DESCRIPTION OF THE INVENTION

In one embodiment, the present invention provides a voltage-mode write driver and technique for measuring the write head voltage in a magnetic recording system, such as a disk drive, using a buffer integrated within the preamplifier of the disk drive. The buffer (e.g., amplifier) isolates the head voltage measurement from any apparatus used when making the measurement, and allows calibration (optimization) of the write current amplitude based on that voltage measurement.

Figure 1B:
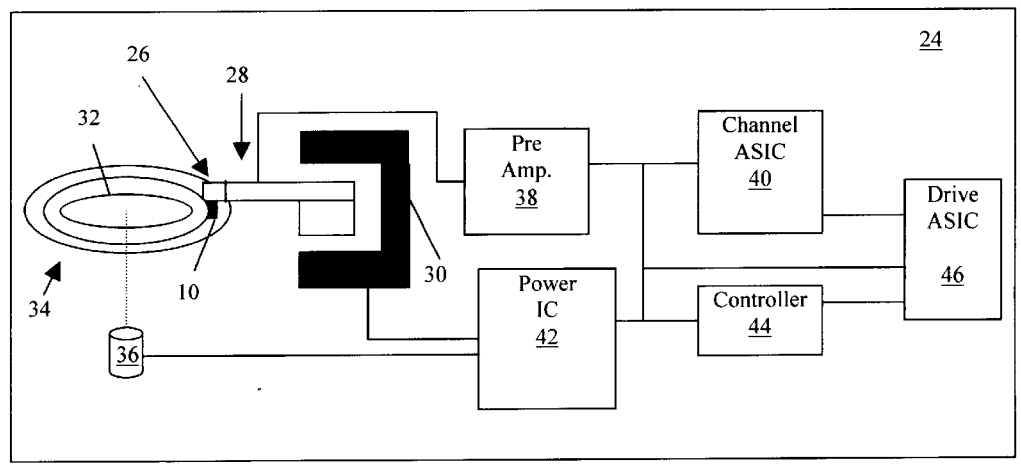
FIG. 1B shows an example block diagram of an embodiment of a disk drive in which the present invention can be implemented.

FIG. 1B shows an example block diagram of a magnetic recording system, such as a disk drive 24 in which the present invention can be implemented. The disk drive 24 comprises a head structure 26 including one or more magneto-resistive read transducers 10 moved by a support arm of an actuator assembly 28 via a VCM 30 across tracks 32 of one or more disks 34 rotated by a spindle motor 36 for data storage and data retrieval, and tracking to maintain the head 10 over a target position. The disk drive 24 further includes a preamplifier 38 for amplifying the read and write signals from and to the head 10, respectively, and a channel controller (ASIC) 40 for processing these signals and encoding and decoding data between user information and data written on disks 34. The channel ASIC 40 also decodes servo track number and converts servo burst amplitudes into digital values. The disk drive 24 further includes a power driver circuit (IC) 42 for driving the actuator 30 and the spindle motor 36 for rotating the disks 34, and a microcontroller (e.g. microprocessor) 44 and drive controller (ASIC) 46 for general control of the components of the disk drive 24 and interface to a host system.

Figure 2:
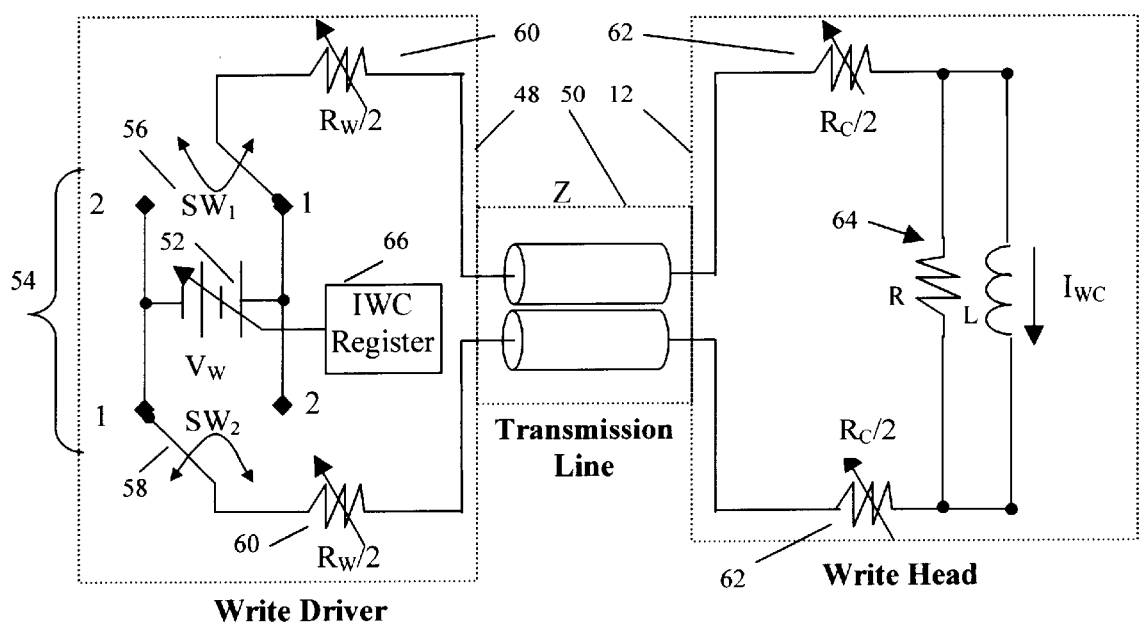
FIG. 2 shows an example block diagram of an embodiment of a differential voltage-mode write driver, transducer head write coil and interconnect, according to the present invention.

FIG. 2 shows an example block diagram of an embodiment of a write signal path including a differential voltage-mode write driver 48, transducer write element 12 and interconnect 50, according to the present invention. The differential voltage-mode write driver 48 can be effectively modeled as a programmable voltage source $V_W$ 52, connected to a load 12 via a switch 54 including switches $SW_1$ 56 and $SW_2$ 58, followed by a pair of termination resistors 60 ($R_W/2$). The interconnect 50 comprises a differential transmission line having impedance Z, connecting the write driver 48 and the write element 12, serving to cunduct the write current $I_{WC}$ to the thin film write element 12. The write element (write head) 12 can be effeciveiy modeled as a pair of resistors 62 ($R_C/2$), in series with a parallel resistor inductor R-L network 64.

Accurate control of the write current amplitude $I_{WC}$ is limited by the variation of the DC resistance of the thin-film write head, $R_C$, and termination resistance $R_W$. As such, the write current amplitude $I_{WC}$ is dependent on the total series DC resistance ($R_C+R_W$) as well as the programmable voltage-mode driver amplitude, $V_W$. The present invention provides a method for controlling the amplitude of the write current $I_{WC}$ independent of the total DC resistance of the write signal path, $R_C+R_W$.

In the example of FIG. 2, a user programs the magnitude of the voltage source $V_W$ via a program register (IWC Register) 66, thereby adjusting the amplitude of the write current, $I_{WC}$. Based on the circuit model of FIG. 2, the write current amplitude $I_{WC}$ can be represented the following Relation 1:

$$I_{WC}=V_W/(R_C+R_W) \quad\text{(Relation 1)}$$

Figure 3:
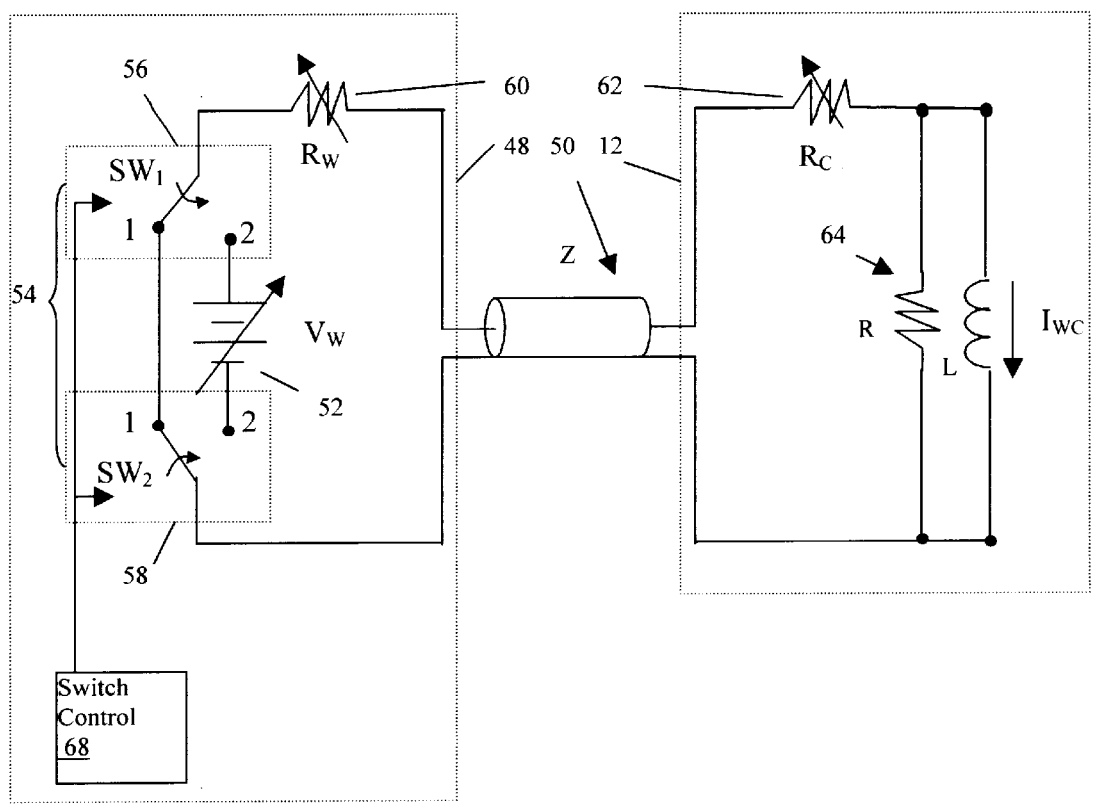
FIG. 3 shows a simplified diagram of an example write signal path of FIG. 2 wherein only half of the write driver current is shown for simplicity.

FIG. 3 shows the voltage-mode driver 48 of FIG. 2 as a single-ended circuit to simplify the following description, without loss of generality. The example method described herein is applicable in the case of both differential circuit of FIG. 2 as well as single-ended circuit of FIG. 3. As shown in FIG. 3, in one embodiment, the write-signal path comprises the (programmable) voltage source $V_W$ 52 with associated series terminating resistor $R_W$ 60 the write element 12, and the interconnect 50 (transmission line) with impedance Z. The resistor $R_W$ 60 is connected to an inductive load comprising the transmission line 50 and write element 12, wherein the transmission line connects the write-driver 48 to the write element 12. In this example, the write element 12 is modeled as a series resistor $R_C$ 62 followed by a parallel R-L circuit 64 representing a thin-film write coil of the head 10. The write driver 48 further includes the switch 54 including switches $SW_1$ 56, and $SW_2$ 58 that change the polarity of the voltage source $V_W$ 25 for write operations in response to switching control signals from a switch control 68.

The transmission line 50 has the characteristic impedance Z, wherein in the voltage driven circuit 48 of the present invention with the terminating series resistor $R_W$ 60 the resistor $R_W$ 60 is matched very closely to the impedance Z of the transmission line 50. The termination resistor $R_W$ 60 reduces ringing and provides expanded bandwidth by absorbing the reflected electro-magnetic waves that result from applying write current impulse signals to the inductive write head 12.

In operation of example circuit in FIG. 3, the amplitude of the write current $I_{WC}$ switches from a value of zero when $SW_1$ 56 and $SW_2$ 58 are in position 1, to a value of $I_{WC}$ when $SW_1$ 56 and $SW_2$ 58 are in position 2 (similarly, in operation of example circuit of FIG. 2, the amplitude of the write current $I_{WC}$ switches from a value of $-I_{WC}$ when $SW_1$ and $SW_2$ are in position 1, to a value of $+I_{WC}$ when $SW_1$ and $SW_2$ are in position 2).

An object of the present invention is to provide a method and circuit for controlling the amplitude of the write current $I_{WC}$ through the coil L in R-L network 64. Referring back to FIG. 3, when $SW_1$ 56 and $SW_2$ 58 are in position 2, the voltage source $V_W$ 52, the series resistor $R_W$ 60 and transmission line 50 are in series with the write head 12. Wherein the current path is across the voltage source (e.g., battery) $V_w$ 52 through the resistors $R_W$ 60, $R_C$ 62 and through the short of the inductor L, such that the value of the write current amplitude $I_{WC}$ is determined as Relation 2:

$$I_{WC}=V_W/(R_W+R_C) \quad\text{(Relation 2)}$$

The sensitivity of the write current amplitude $I_{WC}$ to the thin-film writer coil resistance $R_C$ 62 is calculated as the derivative of $I_{WC}$ with respect to $R_C$ $I_{WC}$, according to Relation 3:

$$d\{I_{WC}\}/d\{R_C\}=-V_W/(R_W+R_C)^2 \quad\text{(Relation 3)}$$

As described, the write current amplitude sensitivity is an aspect of voltage-mode write drivers. In order to overcome this sensitivity, according to the present invention, in one example the programmable voltage source $V_W$ 52 is adjusted/calibrated to substantially, and preferably exactly, counteract the resistance variation that results from the variable resistances $R_W$ and $R_C$ in a population of write-drivers and corresponding transducer heads. The calibration associated with the method of the present invention allows normalization of the actual write current amplitude for each disk drive (out of the equation). Any remaining uncertainties can then be studied across a population of heads/media. These uncertainties may include other factors such as: fly height, media coercivity, spurious noise, etc.

The write-driver 48 can be a component of the preamplifier 38 of the disk drive 24 (FIG. 1B), wherein in each write driver 48, the resistance $R_W$ can be different than that of other write drivers 48 in other disk drives 24. Similarly, the resistance $R_C$ can be different from one write element 12 to another. Therefore, in one example method according to the present invention, the write current is calibrated (optimized) for each write-driver 48 and corresponding write head 12 based on measurements of $R_C$ and $R_W$ for that head 12 and write driver 48, respectively. In another example method, a series of measurements of $R_C$ and $R_W$ for a population of write drivers 48 and corresponding write heads 12 are performed, to obtain a global setting of the write driver voltage supply 52 for all the head-preamplifiers within that disk drive population.

Figure 4:
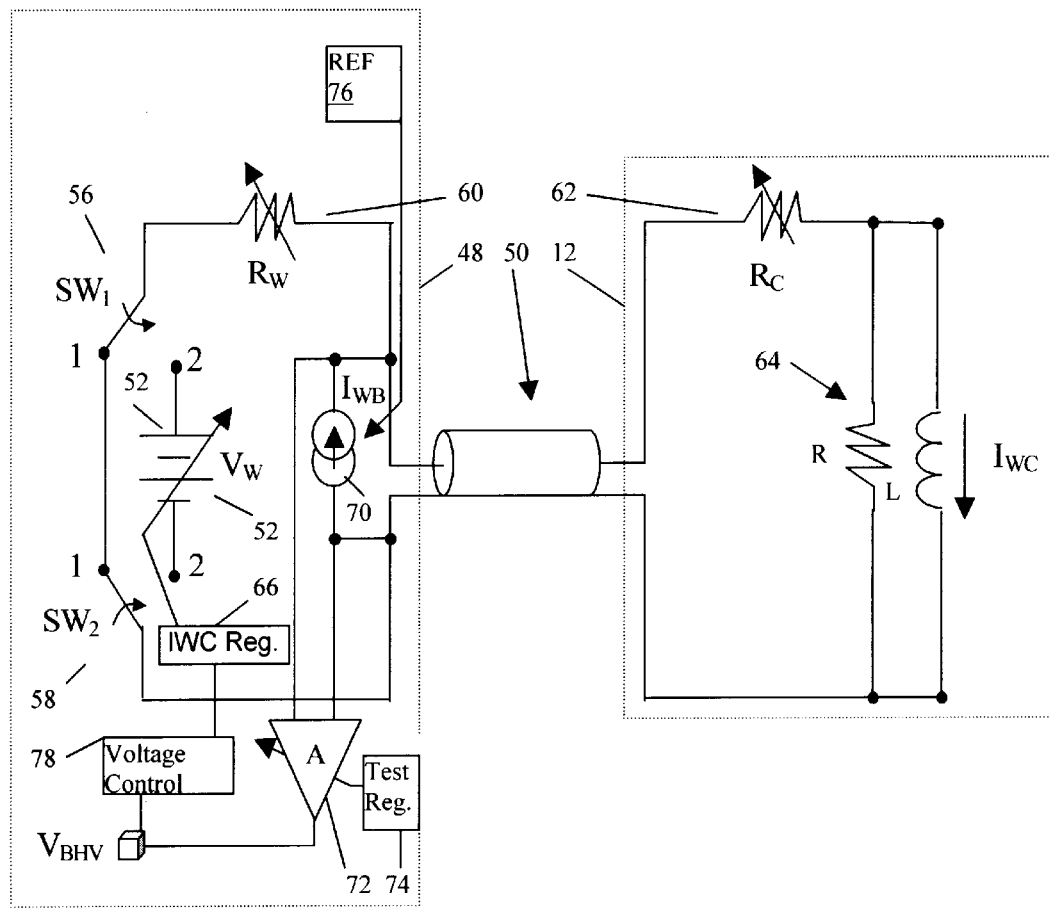
FIG. 4 shows an example write current calibration circuit using buffered head voltage, according to the present invention.
Figure 5:
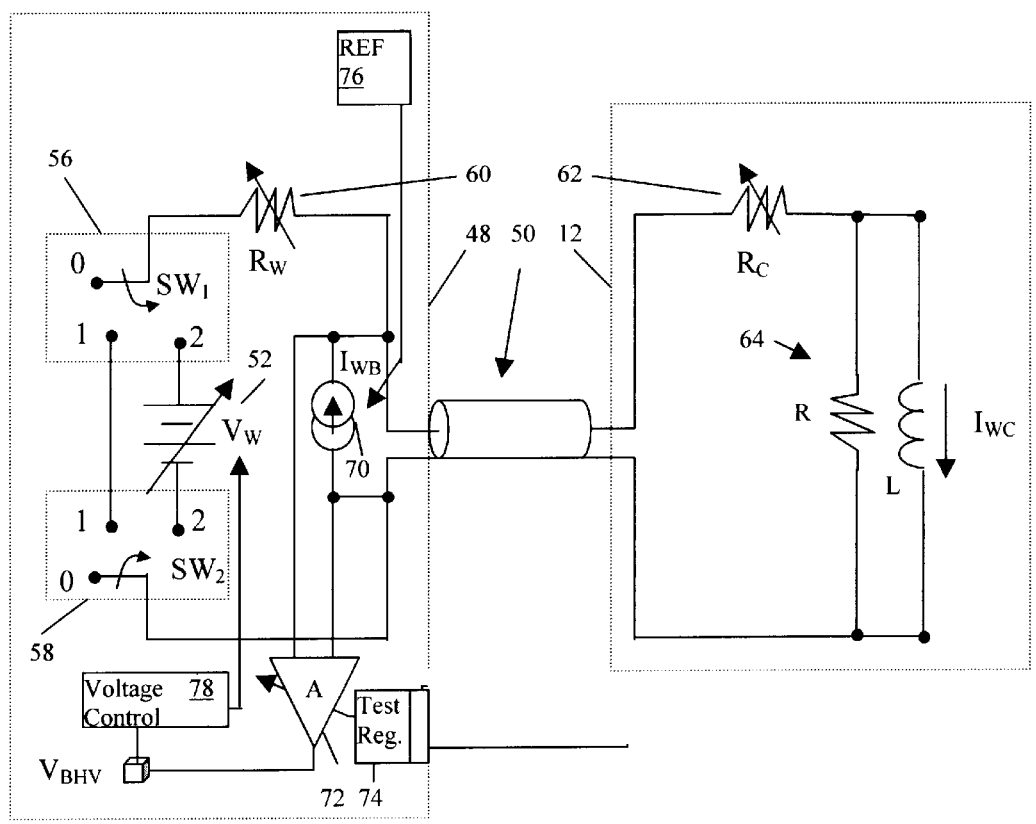
FIG. 5 shows another example write current calibration circuit using buffered head voltage, according to the present invention.

FIGS. 4–5 show example circuits 48 used for calibrating (e.g., selecting) the value of voltage source $V_W$ 52 to select (e.g., optimize) the amplitude of the write current $I_{WC}$, according to the present invention. Either of the circuits in FIGS. 4–5 can be employed, depending on the implementation of the voltage-mode switches, $SW_1$ 56 and $SW_2$ 58. If the switches $SW_1$ 56 and $SW_2$ 58 can be tri-stated (e.g., placed in an electrical high impedance mode of operation, or electrically floating), then the example circuit of FIG. 5 and associated method can be used. Alternatively, the similar example circuit of FIG. 4 and associated method can be used for the case wherein the switches cannot be tri-stated.

The example circuits of FIGS. 4–5 include the components of FIG. 3, and further a current source $I_{WB}$ 70 and a programmable-gain low-bandwidth buffer amplifier 72, with voltage gain A, programmable via a register (Test Register) 74. In these examples, the current source $I_{WB}$ 70 is derived from e.g. an on-chip reference current (REF) 76, obtained from a band-gap reference circuit or a fuse trimmed resistor. This reference current $I_{WB}$ provides the basis for comparison by which the write current $I_{WC}$ is calibrated. The reference current $I_{WB}$ is known and fixed. The write current is calibrated against the precise reference current ($I_{WB}$), independent of the DC resistance $R_C$ of the thin-film write head 12. As such, the write current amplitude $I_{WC}$ can be accurately controlled without sensitivity to the DC resistance $R_C$ of the head 12 plus interconnect resistance or the output impedance of the write driver, $R_W$.

In one example, the amplitude of the reference current $I_{WB}$ is less than about 1 mA so as not to impact the magnetization of the disk media. The value of the reference current $I_{WB}$ should not be too small, however, so as to provide a large amplitude voltage signal when multiplied by the head series resistance $R_C$. An example value for the reference current $I_{WB}$ can be between about 250 uA and 1 mA. Preferably, the programmable amplifier 72 has low and high gain settings of e.g. about 5V/V and about 150V/V, respectively. The range of said gain settings may be optimized depending on the range of head resistance $R_C$ expected as well as the supply voltage $V_W$ and linear range of the buffer amplifier 72. Preferably, the amplifier 72 gains are fairly precise (e.g., on the order of about 5% tolerance).

Figure 6:
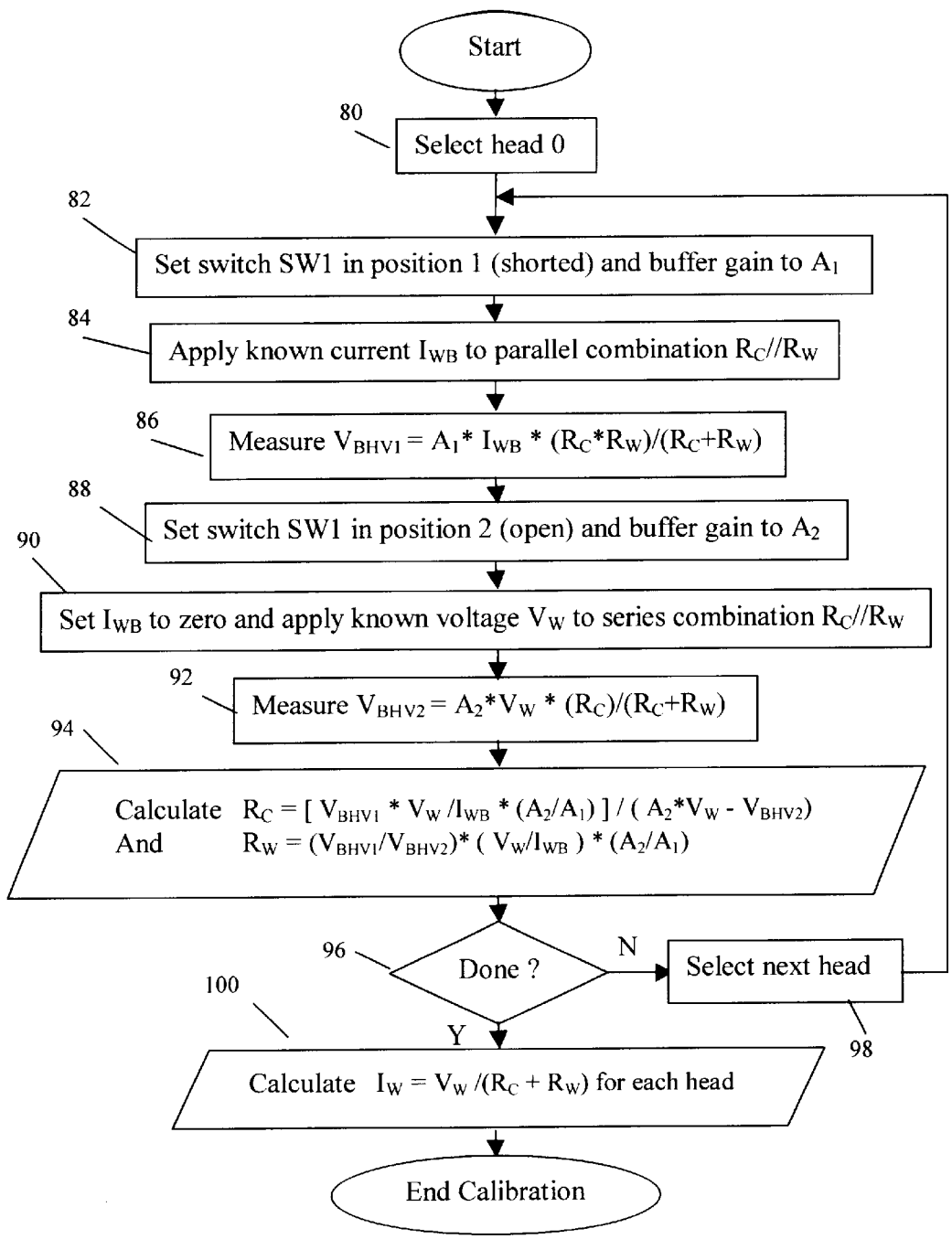
FIG. 6 shows an example flowchart is steps for calibrating the write current for a typical multi-channel disk-drive preamplifier, according to the present invention.

As described, the circuits of FIGS. 4–5 are used in conjunction with two example calibration methods/algorithms, depending on the structure of the voltage-mode switches $SW_1$ 56 and $SW_2$ 58. For example, FIG. 6 shows example steps for calibrating the write current amplitude using the example circuits herein, described further below.

The example circuit in FIG. 4 is used for calculating the series resistance $R_C$ 62 of the write head 12, wherein the voltage of the applied voltage-mode write driver 48 can be set to zero (i.e., the applied voltage of the voltage-mode write driver can be set to zero). Referring to the example steps in flowchart of FIG. 6, this example for optimizing the write current $I_{WC}$ amplitude for each write head 12, includes the steps of: selecting a head 12 (step 80), setting switches $SW_1$ 56 and $SW_2$ 58 in position 1 (so that no voltage is applied to the head load) and setting the gain of the voltage buffer amplifier 72 to $A_1$ (step 82), turning on the current source $I_{WB}$ 70 to the parallel combination of $R_W$ 60 and $R_C$ 62 (step 84), and after settling to the steady-state, measuring the voltage across the head load 12, $V_{BHV1}$ (step 86), wherein:

$$V_{BHV1} = A_1 \times I_{WB} \times (R_C \times R_W)/(R_C + R_W) \quad \text{(Relation 4)}$$

Then, the switches $SW_1$ 56 and $SW_2$ 58 are placed in position 2 (so that a voltage of $V_W$ is applied to the series connection of the head load and the series termination resistor $R_W$), the gain of amplifier 72 is set to $A_2$ (step 88), the current $I_{WB}$ 70 is set to zero, and known voltage $V_W$ 52 is applied to the series combination of $R_C$ 62 and $R_W$ 60 (step 90). The voltage across the head load 12, $V_{BHV2}$, is measured (step 92), wherein:

$$V_{BHV2} = A_2 \times V_W \times (R_C)/(R_C + R_W) \quad \text{(Relation 5)}$$

Then, the values of $R_C$ 62 and $R_W$ 60 are determined (step 94), wherein taking the ratio of ($V_{BHV1}/V_{BHV2}$) provides a direct measure of $R_W$ 60 as follows:

$$V_{BHV1}/V_{BHV2} = [A_1 \times I_{WB} \times (R_C \times R_W)/(R_C + R_W)]/[A_2 \times V_W \times (R_C)/(R_C + R_W)] = (A_1/A_2) \times (I_{WB}/V_W) \times R_W$$

Or equivalently, $$R_W(V_{BHV1}/V_{BHV2}) \times (V_W/I_{WB}) \times (A_2/A_1) \quad \text{(Relation 6)}$$

Calculating $R_C$ 62 by substituting for $R_W$ 60 into Relation 5 for $V_{BHV2}$ provides the resistance $R_C$ 62 in Relation 7:

$$R_C = [V_{BHV1} \times V_W/I_{WB} \times (A_2 \times A_1)]/(A_2 \times V_W - V_{BHV2}) \quad \text{(Relation 7)}$$

For measurement of more heads 12 in the disk drive and more disk drives and corresponding write drivers 42 (i.e., calibration for a population of disk drives, wherein in each disk drive 24, a write driver 48 is connected to one or more write elements 12) (step 96), then the next head is selected (step 98) and steps 82–96 are repeated until the above measurements for all heads 12 (and optionally additional disk drives) are performed.

After the measurements, for each head 12, the calculated resistance $R_C$ 62 provides the value of the series resistance of that selected head 12, allowing calibration of the actual current $I_{WC}$ in that head 12 as a ratio of the applied voltage $V_W$ 52 of the voltage-mode write driver 42 vs. the series combination of the termination resistance $R_W$ 60 and the head load resistance $R_C$ 62, such that $I_{WC} = V_W/(R_C + R_W)$ (step 100).

In one example, the programmable voltage source $V_W$ 52 is adjusted to counteract the measured resistance variation that results from the variable resistances $R_W$ and $R_C$ in a population of write-drivers and corresponding transducer heads. The measurements for the heads in the population of disk drives are used to determine a set of values $R_C$ and $R_W$ normalized for the population of disk drives, allowing calibration of the actual current $I_{WC}$ for each of the multitude of transducer heads in multiple disk drives, as a ratio of the applied voltage $V_W$ 52 of the voltage-mode write drivers in the multiple disk drives vs. the series combination of the normalized termination resistances $R_W$ and $R_C$, such that $I_{WC}=V_W/(R_C+R_W)$ for the multitude of heads in the multiple disk drives. The calibration associated with the method of the present invention allows normalization of the actual write current amplitude for each of the multitude of transducer write heads in the multitude of disk drives.

Referring to FIG. 5, another example circuit and method of calculating the series resistance $R_C$ of the head 12 are provided, wherein the voltage-mode write driver 48 can be set to a high-impedance state (i.e., tri-stated). This example method for calibrating the write current amplitude $I_{WC}$ includes the steps of: setting switches $SW_1$ 56 and $SW_2$ 58 in position 0 (tri-state), setting gain of the voltage buffer amplifier 72 to $A_1$, turning on the current source $I_{WB}$ 70, and measuring the voltage across the head load, $V_{BHV3}$, wherein:

$$V_{BHV3}=A_1 \times I_{WB} \times R_C \quad \text{(Relation 8)}$$

The resistance $R_C$ is then calculated according to Relation 9:

$$R_C=V_{BHV3}/(A_1 \times I_{WB}) \quad \text{(Relation 9)}$$

The value of $R_W$ can be calculated in one of two methods, with the switches $SW_1$ 56 and $SW_2$ 58 set in position 1, or position 2, described below.

In the first method, with the switches $SW_1$ 56 and $SW_2$ 58 in position (e.g., tri-stateable write driver that can also be shorted), measuring the load voltage across the head load, $V_{BHV4}$, wherein:

$$V_{BHV4}=A_1 \times I_{WB} \times (R_C \times R_W)/(R_C+R_W) \quad \text{(Relation 10)}$$

Solving for $R_W$ 60 by substituting the previously calculated value for $R_C$ 62, as in Relation 11:

$$R_W=[V_{BHV3} \times V_{BHV4}]/(I_{WB} \times A_1 \times [V_{BHV3}-V_{BHV4}]) \quad \text{(Relation 11)}$$

In the second method, with the switches $SW_1$ 56 and $SW_2$ 58 in position 2 (tri-state able write driver that can not be shorted), measuring the voltage across the head load, $V_{BHV5}$, wherein:

$$V_{BHV5}=A_2 \times I_{WB} \times (R_C \times R_W)/(R_C+R_W)+A_2 \times V_W \times (R_C)/(R_C+R_W) \quad \text{(Relation 12)}$$

Then substituting the value of $R_C$ 62 as a function of $A_1$, $V_{BHV3}$ and $I_{WB}$, and solving for $R_W$ 60:

$$R_W=[A_2 \times V_W-V_{BHV5}] \times V_{BHV3}/[A_1 \times I_{WB} \times (V_{BHV5}-V_{BHV3} \times A_2/A_1)] \quad \text{(Relation 13)}$$

Once the values of $R_W$ 60 and $R_C$ 62 are calculated, the amplitude of the write current $I_{WC}$ is determined by Relation 14:

$$W_C=V_W/(R_W3+R_C) \quad \text{(Relation 14)}$$

Knowing the values $R_W$ 60 and $R_C$ 62, the voltage source $V_W$ 52 is adjusted (e.g., programmed) for a desired write current $I_{WC}$. In one embodiment, the above steps are implemented in a controller 78 (FIG. 4) which determines the values $R_W$ and $R_C$ as described, and sets the IWC Register 66 to program the voltage source 52 to generate a voltage $V_W$ to obtain the desired write current $I_{WC}$, according to Relation 14. The controller 78 can be e.g. a logic circuit (ASIC) and associated firmware located in the disk drive 24, and allows automatic measurement of thin-film write head DC head voltage in the disk-drive 24.

As such, according to the present invention, the write current amplitude $I_{WC}$ can be accurately controlled without sensitivity to the DC resistance of the head $R_C$ 62 plus interconnect resistance or the output impedance of the write driver 48. Without employing the techniques described herein, along with the additional circuitry for providing a bias current $I_{WB}$ 70 and a buffer amplifier 72, the write current amplitude is subjected to an unknown variation due to process tolerances in the head 12 and preamplifier 38. These variances can degrade the write process by an unknown disturbance function. As such, the present invention overcomes the uncertainty in write current amplitude that results from the use of a voltage-mode or matched-impedance write driver architecture, by providing a method and practical circuit for calibrating the write current amplitude against a precise (e.g., on-chip) reference current $I_{WB}$ 70 (based on REF 76) independent of the DC resistance of the thin-film write head 12.

In one example, the desired (optimum) write current is determined based on the overall performance of the disk drive system. When data is read back from the disk drive, several performance parameters may be extracted when writing specific patterns. For example, Overwrite is a parameter that is measured by writing a high frequency pattern then overwriting with a lower frequency pattern (or vice versa) to determine if there are any artifacts of the erased (overwritten) pattern in the resultant data. Another performance parameter that can be used to determine optimum write current is the NLTS (non-linear transition shift), measured by writing a specific pattern to the disk and then reading back the waveform. Harmonic content of the read back waveform is sensitive to pattern shift that is a result of a poor write current setting. An optimization routing is used to select the proper write current amplitude based on minimizing the NLTS and maximizing the overwrite. Also, SNR is used as a measure of write performance.

The present invention has been described in considerable detail with reference to certain preferred versions thereof; however, other versions are possible. Therefore, the spirit and scope of the appended claims should not be limited to the description of the preferred versions contained herein.

What is claimed is:

1. A method of controlling the write current of a write driver coupled to a write element for a data storage device, the write driver including a terminating resistor, the method comprising the steps of:

measuring the resistance $R_W$ of the terminating resistor,
   measuring the resistance $R_C$ of the write element, and
   generating the write current amplitude based on the resistances $R_C$ and $R_W$.

2. The method of claim 1, wherein the write driver further includes a voltage source and a switch for electrically connecting the voltage source $V_W$ in series with the terminating resistor $R_W$ and the write element, such that the steps of measuring $R_W$ and $R_C$ further include the steps of:

with the voltage source disconnected, connecting a current source $I_{WB}$ across the parallel combination of the terminating resistor and the write element, and measuring a resulting first voltage across the parallel combination of the resistances $R_C$ and $R_W$;

with the current source disconnected, connecting the voltage source in series with the terminating resistor and the write element, and measuring a second voltage across the series combination of the resistances $R_C$ and $R_W$; and determining the values of $R_C$ and $R_W$ based on said two measured first and second voltages.

3. The method of claim 2, wherein the step of generating the write current further includes the steps of adjusting the voltage source to generate a desired write current amplitude based on the resistances $R_C$ and $R_W$.

4. The method of claim 2, wherein the step of generating the write current further include the steps of adjusting the voltage $V_W$ of the voltage source to generate a desired write current $I_{WC}$ based on the resistances $R_C$ and $R_W$, such that: $I_{WC}=V_W/(R_C+R_W)$.

5. The method of claim 2, wherein the level of current from the current source $I_{WB}$ is based on a precise reference current independent of the DC resistance of the write element, such that write current amplitude is accurately controlled without sensitivity to the DC resistance $R_C$ of the write element or the output impedance $R_W$ of the write driver.

6. The method of claim 2, wherein the step of generating the write current includes the steps of calibrating the write current against the current source $I_{WB}$, wherein the current source $I_{WB}$ is based on a precise reference current independent of the DC resistance of the write element, such that write current amplitude is accurately calibrated without sensitivity to the DC resistance $R_C$ of the write element or the output impedance $R_W$ of the write driver.

7. The method of claim 1, wherein the write driver further includes a voltage source and a switch for electrically connecting the voltage source in series with the terminating resistor $R_W$ and the write element, such that the steps of measuring $R_W$ and $R_C$ further include the steps of:

with the voltage source disconnected, connecting a current source $I_{WB}$ across the parallel combination of the terminating resistor $R_W$ and the series resistance $R_C$ the write element, and measuring a first voltage $V_{BHV1}$ across the parallel combination of the resistances $R_C$ and $R_W$, as a function of:

$$[I_{WB}\times(R_C\times R_W)/(R_C+R_W)];$$

with the current source disconnected, connecting the voltage source at a voltage $V_W$, in series with the terminating resistor $R_W$ and the series resistance $R_C$ of the write element, and measuring a second voltage $V_{BHV2}$ across the series combination of the resistances $R_C$ and $R_W$, as a function of:

$$[V_W\times(R_C)/(R_C+R_W)];$$

determining $R_W$ as a function of:

$$[(V_{BHV1}/V_{BHV2})\times(V_W/I_{WB})];\text{ and}$$

determining $R_C$ as a function of:

$$[(V_{BHV1}\times V_W/I_{WB})/(V_W-V_{BHV2})].$$

8. The method of claim 1, wherein the write driver further includes a voltage source and a switch for electrically connecting the voltage source in series with the terminating resistor $R_W$ and the write element, such that the steps of measuring $R_W$ and $R_C$ further include the steps of:

with the voltage source disconnected, connecting a current source $I_{WB}$ across the parallel combination of the terminating resistor $R_W$ and the series resistance $R_C$ of the write element, and measuring a first voltage $V_{BHV1}$ across the parallel combination of the resistances $R_C$ and $R_W$ using a gain amplifier at a gain $A_1$, as a function of:

$$[A_1\times I_{WB}\times(R_C\times R_W)/(R_C+R_W)];$$

with the current source disconnected, connecting the voltage source at a voltage $V_W$, in series with the terminating resistor $R_W$ and the series resistance $R_C$ of the write element, and measuring a second voltage $V_{BHV2}$ across the series combination of the resistances $R_C$ and $R_W$ using a gain amplifier at a gain $A_2$, as a function of:

$$[A_2\times V_W\times(R_C)/(R_C+R_W)];$$

determining $R_W$ as a function of:

$$[(V_{BHV1}/V_{BHV2})\times(V_W/I_{WB})\times(A_2/A_1)];\text{ and}$$

determining $R_C$ as a function of:

$$[(V_{BHV1}\times V_W/I_{WB}\times(A_2/A_1))/(A_2\times V_W-V_{BHV2})].$$

9. A method of calibrating the write current of a write driver coupled to a write element for a disk drive, the write driver including a terminating resistor, a voltage source and a switch for electrically connecting the voltage source in series with the terminating resistor and the write element, the method comprising the steps of:

with the voltage source disconnected, connecting a current source $I_{WB}$ across the parallel combination of the terminating resistor and the write element, and measuring a resulting first voltage across the parallel combination of the terminating resistor ($R_W$) and series resistance of the write element ($R_C$), wherein the current source is independent of the DC resistance of the write element, with the current source disconnected, connecting the voltage source in series with the terminating resistor and the write element, and measuring a second voltage across the series combination of the resistors $R_C$ and $R_W$;

determining the values of $R_C$ and $R_W$ based on said two measured first and second voltages;

calibrating the write current amplitude based on the resistances $R_C$ and $R_W$, such that the current amplitude is essentially insensitive to the DC resistance $R_C$ of the write element or the output impedance $R_W$ of the write driver.

10. The method of claim 9, wherein the step of calibrating the write current further includes the steps of adjusting the voltage source to generate a desired write current amplitude based on the resistances $R_C$ and $R_W$.

11. The method of claim 9, wherein the step of calibrating the write current further include the steps of adjusting the voltage ($V_W$) of the voltage source to generate a desired write current $I_{WC}$ based on the resistances $R_C$ and $R_W$, such that:

$$I_{WC}=V_W/(R_C+R_W).$$

12. The method of claim 11, wherein:
said first measured voltage, $V_{BHV1}$, across the parallel combination of the resistances $R_C$ and $R_W$ is a function of:

$$(I_{WB} \times (R_C \times R_W)/(R_C + R_W));$$

said second measured voltage, $V_{BHV2}$, across the series combination of the resistances $R_C$ and $R_W$ is a function of:

$$(V_W \times (R_C)/(R_C + R_W));$$

the resistance $R_W$ is a function of:

$$((V_{BHV1}/V_{BHV2}) \times (V_W/I_{WB}));$$

and
the resistance $R_C$ is a function of:

$$((V_{BHV1} \times V_W/I_{WB})/(V_W - V_{BHV2})).$$

13. The method of claim 11, wherein:
the steps of measuring the first voltage, $V_{BHV1}$, across the parallel combination of the resistances $R_C$ and $R_W$ further includes the steps of using a gain amplifier at a gain $A_1$, such that the first voltage $V_{BHV1}$ is a function of:

$$[A_1 \times I_{WB} \times (R_C \times R_W)/(R_C + R_W)];$$

the steps of measuring the second voltage, $V_{BHV2}$, across the series combination of the resistances $R_C$ and $R_W$ further includes the steps of using a gain amplifier at a gain $A_2$, such that the second voltage $V_{BHV2}$ is a function of:

$$[A_2 \times V_W \times (R_C)/(R_C + R_W)];$$

the resistance $R_W$ is a function of:

$$[(V_{BHV1}/V_{BHV2}) \times (V_W/I_{WB}) \times (A_2/A_1)];$$ and the resistance $R_C$ is a function of:

$$[(V_{BHV1} \times V_W/I_{WB} \times (A_2/A_1))/(A_2 \times V_W - V_{BHV2})].$$

14. A voltage-mode write driver for an inductive load in a write element for a disk drive, the write driver comprising:
(a) an adjustable voltage source;
(b) a series termination resistor;
(c) a switch responsive to control signals, for electrically connecting the voltage source in series with the termination resistor and the write element;
wherein the termination resistor has a resistance $R_W$ and the write element has a resistance of $R_C$, wherein the voltage source can be adjusted based on the resistances $R_C$ and $R_W$, such that when said switch is closed to electrically connect the voltage source in series with the termination resistor and the write element, a desired write current flows through the write element.

15. The write driver of claim 14, further comprising:
a controller which determines the resistance $R_W$ of the termination resistor and the series resistance $R_C$ of the write element based on the output voltage of the write driver, and adjusts the voltage source based on the resistances $R_C$ and $R_W$ to provide a voltage $V_W$ resulting in a desired write current amplitude $I_{WC}$, wherein $I_{WC}$ is a function of $(V_W/(R_C + R_W))$.

16. The write driver of claim 15, further comprising:
a buffer amplifier which measures the voltage at the output of the write driver.

17. The write driver of claim 14, wherein:
in response to first control signals, the switch disconnects the voltage source, and connects a current source $I_{WB}$ across the parallel combination of the terminating resistor and the write element, for measuring a resulting first voltage across the parallel combination of the terminating resistor ($R_W$) and series resistance of the write element ($R_C$), wherein the current source is independent of the DC resistance of the write element, and in response to second control signals, the switch disconnects the current source, and connects the voltage source in series with the terminating resistor and the write element, for measuring a second voltage across the series combination of the resistors $R_C$ and $R_W$, and determining the values of $R_C$ and $R_W$ based on said two measured first and second voltages to adjust the voltage source based on the resistances $R_C$ and $R_W$.

18. The write driver of claim 13, wherein the inductive load comprises said write element and a transmission line connected to the write element for connection in series with said termination resistor and the voltage source via the switch, the transmission line having a characteristic impedance value, such that the resistance value of said termination resistor is substantially the same as the impedance of the transmission line.

19. The write driver of claim 18, wherein the transmission line has a predetermined propagation time of signals between the write element and the write driver.

20. The write driver of claim 14, wherein write element includes a thin-film inductive write coil with a series real resistance.

21. The write driver of claim 14, wherein:
the voltage source is adjusted based on the resistance $(R_C + R_W)$ to provide a desired write current.

22. The write driver of claim 14, wherein:
the voltage source provides a voltage to counteract the variation of the resistance $(R_C + R_W)$ across a plurality of write drivers and corresponding write elements.

23. In a population of disk drives, each disk drive including a write driver coupled to a write element for recording data on a disk storage surface, the write driver including a terminating resistor, a method of controlling the write current of each write driver, comprising the steps of:
(a) for each disk drive:
(1) measuring the resistance $R_W$ of the terminating resistor,
(2) measuring the resistance $R_C$ of the write element, and
(b) using said measured resistances $R_W$ and $R_C$ for the population of disk drives, to select the write current amplitude for each of multiple disk drives.

24. The method of claim 23, wherein each write driver further includes a voltage source connected in series with the terminating resistor, such that the steps of selecting the write current amplitude further includes the steps of adjusting the voltage source to provide a voltage to counteract the variation of the resistance $(R_C + R_W)$ across the population of write drivers and corresponding write elements.

25. The method of claim 24, wherein the step of selecting the write current in each disk drive further includes the steps of adjusting the voltage ($V_W$) of the voltage source to generate a desired write current $I_{WC}$ based on the resistances $R_C$ and $R_W$ for the population of disk drives, such that:

$$I_{WC} = V_W/(R_C + R_W).$$

26. The method of claim 25, wherein the steps of selecting the write current in each disk drive, further includes the steps of calibrating the write current amplitude based on the resistances $R_C$ and $R_W$ in the population of disk drives, such that the current amplitude is essentially insensitive to the DC resistance $R_C$ of the write element or the output impedance $R_W$ of the write driver, in the population of disk drives.

27. The method of claim 24, wherein in each disk drive, the steps of determining $R_W$ and $R_C$, further includes the steps of:

with the voltage source ($V_W$) disconnected, connecting a current source $I_{WB}$ across the parallel combination of the terminating resistor and the write element, and measuring a resulting first voltage across the parallel combination of the terminating resistor ($R_W$) and series resistance of the write element ($R_C$), wherein the current source is independent of the DC resistance of the write element, with the current source disconnected, connecting the voltage source in series with the terminating resistor and the write element, and measuring a second voltage across the series combination of the resistors $R_C$ and $R_W$; and determining the values of $R_C$ and $R_W$ based on said two measured first and second voltages.

28. The method of claim 27, wherein:

said first measured voltage, $V_{BHV1}$, across the parallel combination of the resistances $R_C$ and $R_W$ is a function of:

$$(I_{WB} \times (R_C \times R_W)/(R_C+R_W));$$

said second measured voltage, $V_{BHV2}$, across the series combination of the resistances $R_C$ and $R_W$ is a function of:

$$(V_W \times (R_C)/(R_C+R_W));$$

the resistance $R_W$ is a function of:

$$((V_{BHV1}/V_{BHV2}) \times (V_W/I_{WB}));$$

and the resistance $R_C$ is a function of:

$$((V_{BHV1} \times V_W/I_{WB})/(V_W - V_{BHV2})).$$

29. The method of claim 27, wherein:

the steps of measuring the first voltage, $V_{BHV1}$, across the parallel combination of the resistances $R_C$ and $R_W$ further includes the steps of using a gain amplifier at a gain $A_1$, such that the first voltage $V_{BHV1}$ is a function of:

$$[A_1 \times I_{WB} \times (R_C \times R_W)/(R_C+R_W)];$$

the steps of measuring the second voltage, $V_{BHV2}$, across the series combination of the resistances $R_C$ and $R_W$ further includes the steps of using a gain amplifier at a gain $A_2$, such that the second voltage $V_{BHVs}$ is a function of:

$$[A_2 \times V_W \times (R_C)/(R_C+R_W)];$$

the resistance $R_W$ is a function of:

$$[(V_{BHV1}/V_{BHV2}) \times (V_W/I_{WB}) \times (A_2/A_1)];\text{ and}$$

the resistance $R_C$ is a function of:

$$[(V_{BHV1} \times V_W/I_{WB} \times (A_2/A_1))/(A_2 \times V_W - V_{BHV2})].$$

30. The method of claim 23, further including the steps of normalizing said measured resistances $R_W$ and $R_C$ to obtain normalized values $R_W$ and $R_C$ for the population of disk drives, wherein step (b) further includes the steps of using said normalized values $R_W$ and $R_C$ to select the write current for each write element in said multiple disk drives.

31. The method of claim 30, wherein in step (b) selecting the write current further includes the steps of calibrating the write current $I_{WC}$ for each write element in said multiple disk drives as a function of an applied voltage $V_W$ of the corresponding write driver and series combination of the normalized values $R_W$ and $R_C$.

32. The method of claim 31, wherein in step (b) calibrating the write current for each write element further includes the steps of calibrating the write current $I_{WC}$ for each write element in said multiple disk drives as a ratio of the applied voltage $V_W$ of the corresponding write driver and series combination of the normalized values $R_W$ and $R_C$, such that $I_{WC}=V_W/(R_C+R_W)$ for each write element in the multiple disk drives.

33. A data storage device prepared for storage of data by the method of claim 1.

34. A disk drive prepared for storage of data by the method of claim 9.

35. A disk drive prepared for storage of data by the method of claim 23.

* * * * *